(12) United States Patent
Kobayashi

(10) Patent No.: US 8,289,232 B2
(45) Date of Patent: Oct. 16, 2012

(54) INFORMATION DISPLAY APPARATUS

(76) Inventor: Senzo Kobayashi, Mie-ken (JP)

(*) Notice: Subject to any disclaimer, the term of this patent is extended or adjusted under 35 U.S.C. 154(b) by 160 days.

(21) Appl. No.: 12/662,936

(22) Filed: May 12, 2010

(65) Prior Publication Data

US 2010/0220060 A1 Sep. 2, 2010

Related U.S. Application Data

(62) Division of application No. 10/591,973, filed as application No. PCT/JP2005/004088 on Mar. 9, 2005, now Pat. No. 7,746,293.

(30) Foreign Application Priority Data

Mar. 9, 2004 (JP) ................................ 2004-066243

(51) Int. Cl.
*G09G 3/00* (2006.01)
(52) U.S. Cl. ...................... 345/30; 345/204; 361/679.21
(58) Field of Classification Search .................. 345/30, 345/204; 361/679.21
See application file for complete search history.

(56) References Cited

U.S. PATENT DOCUMENTS

| 5,472,255 | A  | * | 12/1995 | Moore ......................... 296/97.6 |
| 6,072,154 | A  |   | 6/2000  | Maynard |
| 6,424,387 | B2 | * | 7/2002  | Sato et al. ........................... 349/2 |
| 6,498,597 | B1 | * | 12/2002 | Sawano ......................... 345/107 |
| 6,762,929 | B2 | * | 7/2004  | Sawyer ..................... 361/679.05 |
| 7,463,238 | B2 | * | 12/2008 | Funkhouser et al. ......... 345/107 |
| 7,636,085 | B2 | * | 12/2009 | Yang .............................. 345/204 |
| 7,667,962 | B2 | * | 2/2010  | Mullen .................... 361/679.56 |
| 7,710,370 | B2 | * | 5/2010  | Slikkerveer et al. ............ 345/85 |
| 8,096,068 | B2 | * | 1/2012  | Van Rens ........................ 40/515 |
| 2001/0008582 | A1 | * | 7/2001 | Sato et al. ...................... 396/429 |
| 2002/0070910 | A1 | * | 6/2002 | Fujieda et al. .................. 345/85 |
| 2002/0090980 | A1 | * | 7/2002 | Wilcox et al. ................ 455/566 |
| 2003/0071800 | A1 | * | 4/2003 | Vincent et al. ................ 345/204 |
| 2003/0160755 | A1 | * | 8/2003 | Gettemy et al. ............... 345/156 |
| 2004/0183958 | A1 | * | 9/2004 | Akiyama et al. ................ 349/58 |

(Continued)

FOREIGN PATENT DOCUMENTS

JP 63-195095 12/1988

(Continued)

OTHER PUBLICATIONS

Japanese Patent Application No. 2005-518817 Office Action, dated Feb. 15, 2006.

(Continued)

*Primary Examiner* — Amare Mengistu
*Assistant Examiner* — Dmitriy Bolotin
(74) *Attorney, Agent, or Firm* — McGinn IP Law Group, PLLC

(57) ABSTRACT

An information display apparatus includes a fan face that is openly/closably bent like bellows, the fan face including a thin film flat display formed on a flexible and bendy thin film, the thin film flat display including a full color organic EL display capable of displaying a full color television image, a pair of main ribs joined to respective ends of the fan face, the fan face being disposed between the main ribs, a plurality of intermediate ribs interposed between the main ribs, the fan face being joined to the intermediate ribs, and a pivot for turnably fixing the main ribs and the intermediate ribs in a root portion. A television receiver circuit is disposed in one of the main ribs.

7 Claims, 15 Drawing Sheets

U.S. PATENT DOCUMENTS

| | | | |
|---|---|---|---|
| 2005/0110702 A1 | 5/2005 | Aoki et al. | |
| 2006/0007368 A1* | 1/2006 | Slikkerveer et al. | 349/58 |
| 2006/0034039 A1* | 2/2006 | Van Rens | 361/681 |
| 2006/0107566 A1* | 5/2006 | Van Rens | 40/515 |

FOREIGN PATENT DOCUMENTS

| | | |
|---|---|---|
| JP | 7-140451 | 6/1995 |
| JP | 7-230250 | 8/1995 |
| JP | 10-237439 | 9/1998 |
| JP | 10-289785 | 10/1998 |
| JP | 10-340781 | 12/1998 |
| JP | 11-15397 | 1/1999 |
| JP | 11-327470 | 11/1999 |
| JP | 2002-112819 | 4/2002 |
| JP | 2002-182582 | 6/2002 |
| JP | 2002-260855 | 9/2002 |
| JP | 2002-300506 | 10/2002 |
| JP | 2002-305077 | 10/2002 |
| JP | 2002-372936 | 12/2002 |
| JP | 2003-147345 | 5/2003 |
| JP | 2003-330384 | 11/2003 |
| JP | 2004-32196 | 1/2004 |
| JP | 2005-157085 | 6/2005 |

OTHER PUBLICATIONS

Japanese Patent Application No. 2005-518817 Decision of Final Rejection dated May 25, 2006, with partial English language translation.

Japanese Patent Application No. 2005-290522 Office Action dated Oct. 16, 2006, with partial English translation.

Japanese Office Action dated Aug. 18, 2008, with partial English translation.

* cited by examiner

Fig. 16
(a)
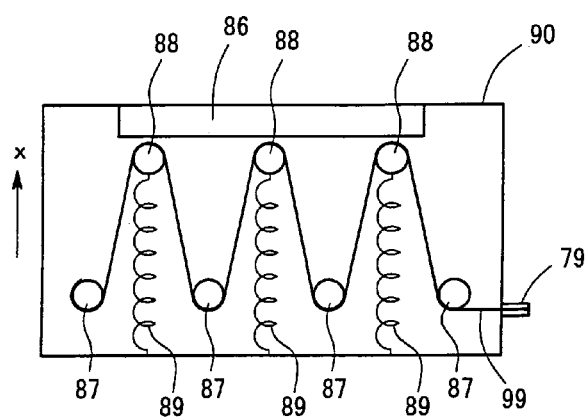
(b)
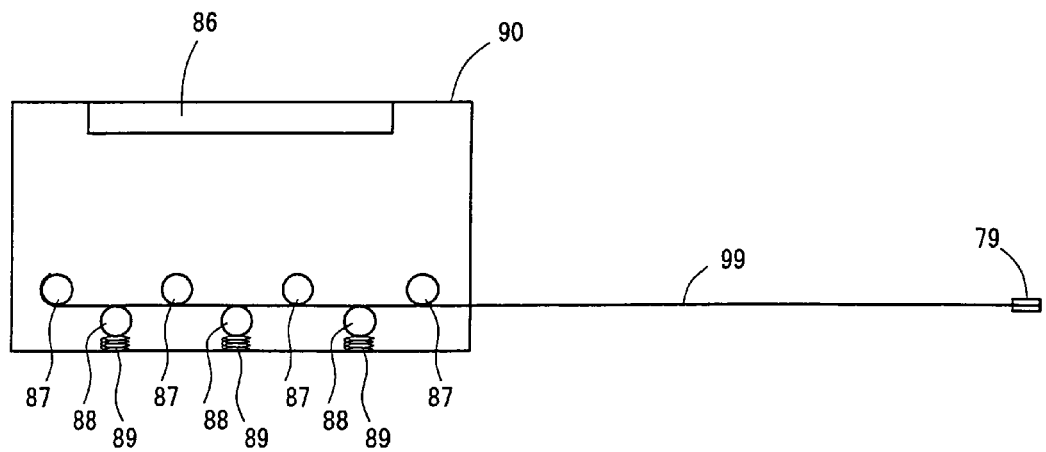

INFORMATION DISPLAY APPARATUS

CROSS-REFERENCE TO RELATED APPLICATIONS

The present Application is a Divisional Application of U.S. patent application Ser. No. 10/591,973, filed Sep. 8, 2006 now U.S. Pat. No. 7,746,293, which was the National Stage of International Application No. PCT/JP2005/4088, filed Mar. 9, 2005. The present Application is based on and claims priority to Japanese patent application No. 2004-066243, filed Mar. 9, 2004, the entire contents of which are incorporated herein by reference.

BACKGROUND OF THE INVENTION

1. Technical Field

The present invention relates to a display apparatus that can be carried anywhere conveniently. Further, the display apparatus of the present invention also includes a display apparatus having functions as a computer and a TV receiver, a phone function, a mobile communication function such as an automatic ticket gate, ETC, RFID, DSRC, and the like as a target and also means an ordinary mobile information processing apparatus.

2. Background Art

Recently, functions of mobile information processing apparatuses such as a mobile personal computer, a mobile phone, and the like are increasingly sophisticated. However, it cannot be said that personal computers are excellent in portability with respect to weight and size. Further, a mobile phone is defective in that a screen is small and difficult to be seen and its operationality is bad.

In contrast, an electronic paper and an organic EL (organic LED) are available as a flat display. In the electronic paper, colored particles disposed in microcapsules are displayed by being displaced or inverted by an electric field and a displayed state is held when no electric field is applied. The organic LED emits light by pouring electrons and electron holes into an organic substance and recoupling them. The following patent documents 1 to 3 are documents as to the electron paper, and the following patent documents 4 to 9 are documents as to the organic EL. Further, the following patent documents 10 to 12 are documents as to folding and accommodation of a display.

Patent Document 1: Japanese Unexamined Patent Application Publication No. 11-327470
Patent Document 2: U.S. Pat. No. 4,143,103
Patent Document 3: U.S. Pat. No. 4,126,854
Patent Document 4: Japanese Unexamined Patent Application Publication No. 2002-305077
Patent Document 5: Japanese Unexamined Patent Application Publication No. 2002-260855
Patent document 6: Japanese Unexamined Patent Application Publication No. 10-340781
Patent document 7: Japanese Unexamined Patent Application Publication No. 10-237439
Patent document 8: Japanese Unexamined Patent Application Publication No. 10-289785
Patent Document 9: Japanese Unexamined Patent Application Publication No. 2003-147345
Patent Document 10: Japanese Unexamined Patent Application Publication No. 2002-300506
Patent Document 11: Japanese Unexamined Patent Application Publication No. 2004-32196
Patent Document 12: Japanese Unexamined Patent Application Publication No. 7-230250

Although thin film flat displays have been developed, since they are formed on a glass substrate, flexibility is not taken into consideration at all. Further, in the technology disclosed in Japanese Unexamined Patent Application Publication No. 7-230250 of the patent document 12 enhances portability of an information processing apparatus by dividing a display and folding or assembling it. However, in a system for gathering divided panels using a liquid crystal and the like, since frames in which no pixel exists are inevitably formed around the peripheries of respective panels, even if the divided panels are unfolded to an overall screen, it is difficult to get view of the screen due to frame lines existing in the screen. Further, the technology disclosed in Japanese Unexamined Patent Application Publication No. 2004-32196 of the patent document 11 proposes a display in which a liquid crystal sheet is taken up when the it is accommodated. However, this technology is impracticable because the liquid crystal sheet is required to have two contradict characteristics, that is, rigidity for keeping it flat when it is unfolded to a flat sheet and softness for taking up it to a columnar shape.

SUMMARY OF THE INVENTION

Accordingly, an object of the present invention is to enhance portability and operationality of an information display apparatus so that a screen can be accommodated compactly.

Further, another object of the present invention is to provide an information display apparatus that has a screen capable of being accommodated compactly and unfolded widely in use and is excellent in portability.

The present invention has novelty and an inventive step in an innovative approach of blending an age-old technology with a latest technology.

It should not be understood that all the inventions have all the objects of the above invention, and it is sufficient that respective inventions have respective objects.

A first exemplary aspect of the present invention is an information display apparatus characterized by being composed of a pair of main ribs located at both ends, a plurality of intermediate ribs interposed between the main ribs, a pivot for turnably fixing the main ribs and the intermediate ribs in a root portion, and a fan face joined to the intermediate ribs between the pair of main ribs as well as openably/closably bent like bellows, wherein at least a part of the fan face is composed of a thin film flat display formed on a flexible and bendy thin film or a thin film flat display formed on a flexible and bendy thin film is disposed to at least a part of the fan face.

The first exemplary aspect of the present invention is a display apparatus similar to a Japanese fan. The display apparatus is provided with the pair of main ribs and the plurality of intermediate ribs interposed between the pair of main ribs to unfold a screen to flat. In a state that the display apparatus is closed, the fan face is accommodated between the pair of main ribs. The fan face is joined to the pair of main ribs at both the ends and joined to all the intermediate ribs between the pair of main ribs. The pair of main ribs and the intermediate ribs interposed between them are bundled by the pivot in the root portion. The intermediate ribs and the fan face are unfolded flat by being guided by the main ribs acting as start ends by the action of the pivot. Note that although the fan face, the main ribs, the intermediate ribs, and the pivot are terms used in the Japanese fan, it should be interpreted that these terms mean portions having the same functions as the respective elements of the Japanese fan.

The first exemplary aspect of the present invention is characterized in that at least a part of the fan face is arranged as a screen paying attention to the accommodating and unfolding function of the Japanese fan. In this case, the fan face may be composed of the thin film flat display formed on the flexible and bendy thin film. That is, the fan face itself, which is bent to a bellows state and unfolded into a flat state, may be composed of the flexible and bendy thin film flat display. Otherwise, the fan face may be composed of a material constituting a fan face of a Japanese fan such as Japanese paper, silk, and the like which are convenient to an open/close operation, and the flexible and bendy thin film flat display may be disposed to the overall portion or at least a part (most preferably to a central portion of the fan face when it is unfolded into a flat state) of the fan face.

When the fan face itself is arranged as the thin film flat display, the overall unfolded fan face may be arranged as an image screen or a part of the fan face may be arranged as the image screen. Since the fan face is made by cutting a rectangular flat surface to a fan shape and an electrode matrix is formed on the rectangular flat surface, an image region on the fan face is formed to a rectangular shape (is not formed to a fan shape). This is the same when the overall fan face is arranged as the screen and when the region of a part of the fan face is arranged as the screen. Further, a flexible and bendy thin film flat display arranged separately from the fan face may be joined to a part of the fan face. Further, the thin film flat display may be formed on a front surface, a back surface, or both the surfaces of the fan face. When the thin film flat displays are formed on both the surfaces, it is possible to display the same image to a person holding the fan and to a person in confrontation with the person at the same time.

When an outer peripheral portion of the fan face (a peripheral portion with a large radius far from the pivot) and an inner peripheral portion of it (a peripheral portion with a small radius near to the pivot) are composed of concentric arcs about the pivot and folding lines used to fold the fan face are formed radially so as to pass through the center of the pivot, it is possible to make the fan face flat when it is unfolded. More specifically, in an ordinary Japanese fan, folding lines of a fan face do not pass through the center point of a pivot, and strips formed by the folding lines have a width larger than a width of a portion to which a geometrically strict fan shape corresponds, thereby when the fan face is unfolded, it rises and falls like a wave. The first exemplary aspect of the present invention may be arranged such that the fan face rises and falls like a wave when it is unfolded. However, when it is arranged as described above, the fan face is made to a flat surface when it is unfolded, thereby an easily viewable image can be displayed. In this case, an image formed on the fan face has no distortion, which is preferable to the first exemplary aspect of the present invention. Further, it is also possible to unfold the fan face such that mountains and valleys are repeated as in an ordinary Japanese fan. In this case, when the intermediate ribs have narrow intervals, a cycle of repetition of the mountains and the valleys of the fan face is made short. Since a shorter cycle makes the valleys shallower, distortion of an image formed on the fan face is reduced. However, when an image formed on the fan face is unfolded in a horizontal direction according to the angles of the mountains and the valleys of the fan face such that an image obtained by projecting the image onto a horizontal surface is made to a normal image, distortion of the image caused by the mountains and the valleys of the fan face can be corrected. The thin film flat display may be composed of any display and is not particularly limited as long as it is formed on a film-like sheet member, which is composed of a flexible and bendy thin film, for example, a resin film, shape memory resin film, shape memory metal thin sheet, metal thin sheet, Japanese paper, silk, and the like, and has a flexible and bendy property in its entirety.

A second exemplary aspect of the present invention is an information display apparatus characterized by being composed of a pair of main ribs located at both ends, a plurality of intermediate ribs interposed by the main ribs, a pivot for turnably fixing the main ribs and the intermediate ribs in a root portion, and a fan face joined to the intermediate ribs between the pair of main ribs as well as openably/closably bent like bellows, wherein in an unfolded state of the fan face, a thin film flat display formed on a flexible and bendy thin film is made to a flat surface and joined to the vertex portions of mountains of the fan face so that the mountains of the fan face are joined in at least a part of the fan face, and when the fan face is folded, the thin film flat display is folded to valleys of the fan face along it in association with the folding operation.

In the second exemplary aspect of the present invention, the thin film flat display is joined to the mountains of the fan face in a flat state such that when the fan face is unfolded, many mountains of the fan face are joined. More specifically, the second exemplary aspect of the present invention is characterized in that when the fan face is unfolded, the thin film flat display is made flat in place of that it is formed to a wave shape. It is needless to say that the thin film flat displays may be disposed on both the surfaces of the fan face. The thin film flat display may be disposed to join many mountains over the entire fan face or may be disposed to the region of a part of the fan face. When the thin film flat display is disposed to the region of the part in a flat state, it is preferably disposed to a central portion of the unfolded fan face. When the fan face is folded, the thin film flat display is also folded to the valleys of the fan face. At the time, it is preferable to join the valleys of the fan face to a back surface of the thin film flat display with strings or to join them vertically with strip-shaped flat sheets. According to this arrangement, when the fan face is folded, since the valleys of it are made deep, the strings and the flat sheets pull the back surface of the thin film flat display toward the valleys, thereby the thin film flat display can be smoothly folded to the valleys of the fan face. The other description of the first exemplary aspect of the present invention is also applied to the description of the second exemplary aspect of the present invention.

A third exemplary aspect of the present invention is an information display apparatus according to the first or the second exemplary aspects of the present invention which is characterized in that the thin film flat display is an organic EL display or an electronic paper. When the thin film flat display is composed of the organic EL display or the electronic paper, it can be provided with a flexible and bendy property and formed very thin. The organic EL display or the electronic paper can be formed on an organic film, a Japanese paper, fiber such as silk, cotton, and the like, and other thin films. In particular, since respective layers of the organic EL display have a thickness of 10 nm to 100 nm, it is possible to make an overall thickness of it including a thin film as a substrate to 0.2 nm or less. In the case of the first exemplary aspect of the present invention, when the fan face itself is composed of the organic EL display, since the organic EL display has the flexible and bendy property when it has a thickness of 2 mm or less, no problem occurs when the fan face is folded and unfolded. Although it is contemplated that the fan face preferably has a thickness of 0.2-0.1 mm, since the thickness of it depends on the number of folds and flexibility, the upper and lower limits of the thickness of it are not particularly limited. When the thin film flat display is joined to the fan face in the first exemplary aspect of the present invention or when the thin film flat display is joined to the mountains of the fan face in the second exemplary aspect of the present invention, it is preferable that the thin film flat display be thinner.

A fourth exemplary aspect of the present invention is an information display apparatus according to any one of the first to the third exemplary aspects of the present invention which is characterized in that a keyboard is disposed to a main rib. The main ribs may be cases also in the first to the third exemplary aspects of the present invention. The keyboard may be disposed on a front surface of the main rib or in an inside of it, that is, in an inside space of the main rib under a lid of an open/close lid disposed to the main rib. A switch mechanism of the keyboard may be arranged arbitrarily. It may be optionally arranged as a button or touch type switch or a membrane switch. Further, the main rib may be provided with a small display for permitting manipulation through the keyboard to be carried out smoothly and data communication with the outside to be easily carried out even if the information display apparatus is closed.

A fifth exemplary aspect of the present invention is an information display apparatus according to any one of the first to the fourth exexmplary aspects of the present invention which is characterized in that keyboards composed of touch switches are disposed to intermediate ribs. A plurality of switches may be disposed to intermediate ribs likewise. In this case, when the fan face is unfolded, data input manipulation can be carried out through the keyboard. Since it is necessary to close the fan face, these switches must be composed of a thin film. Further, it is preferable to form concave portions on front surfaces of the intermediate ribs to prevent surfaces of the switches from projecting from the front surfaces of the intermediate ribs so that the fan face can be smoothly opened and closed.

A sixth exemplary aspect of the present invention is an information display apparatus according to any one of the first to the fifth exexmplary aspects of the present invention which is characterized in that a computer system for information processing is disposed to the main rib. When the main rib is arranged as the case, the computer system may be disposed in it. Further, the main rib may be formed of resin integrally with the computer system (CPU, ROM, RAM, etc.). With this arrangement, the display apparatus of the sixth exemplary aspect of the present invention acts as an information processing apparatus.

A seventh exemplary aspect of the present invention is an information display apparatus according to any one of the first to the sixth exexmplary aspects of the present invention which is characterized in that a microphone and a speaker are mounted on the main rib, an antenna is mounted on the main rib or an intermediate rib is used as an antenna to permit communication of audio, image or data to the outside. The respective components may be accommodated in the cases of the main ribs or may be embedded in the main ribs by being molded of resin integrally with the main ribs.

An eighth exemplary aspect of the present invention is an information display apparatus which is characterized by being composed of a thin film flat display formed on a flexible thin film, a hold means for holding the thin film flat display from a back surface such that it is joined to front surfaces of a plurality of rigid rectangular substrates when they are arranged on a flat surface, a case for accommodating the thin film flat display, and a take-up unit disposed in the case for taking up and accommodating the thin film flat display together with the holding means in the case using a direction parallel with a long side of the substrate as an axis.

The eighth exemplary aspect of the present invention is the information display apparatus for permitting a screen to be taken up. To permit the thin film flat display to be taken up, it must be thin and flexible. However, the thin film flat display arranged thin and flexible is defective when it is used by being unfolded flat because it is difficult to be kept flat. To cope with this problem, the eighth exemplary aspect of the present invention has a feature in that the plurality of rectangular substrates are continuously disposed on the back surface of the thin film flat display and joined thereto. With this arrangement, the substrates can be taken up with the thin film flat display facing inward. Further, when the plurality of rectangular substrates are unfolded flat, since they continuously constitute a flat sheet in their entirety, they are neither curved nor bent in such a manner that the thin film flat display faces outside (it is made convex outward). Accordingly, when a screen is unfolded flat, the resultant screen has a good flatness keeping property. Further, a certain degree of resistant force can be generated by engaging adjacent substrates with each other by claws when bending force acts with the thin film flat display facing inward. With this arrangement, the screen can be kept flat more excellently. However, when the thin film flat display is taken up, the claws must be easily removed so that it can be taken up.

A ninth exemplary aspect of the present invention is an information display apparatus according to the eighth exemplary aspect of the present invention which is characterized in that a magnet is disposed to at least one of two confronting side walls of adjacent substrates. In the ninth exemplary aspect of the present invention, the magnets are bonded to or embedded in the confronting side walls of the substrates in place of the claws. With this arrangement, when the substrates are unfolded flat, a flat sheet can be formed by joining the substrates with each other on the side walls by the attracting force of the magnets. When the magnet is disposed to one of adjacent substrates, the other substrate must be composed of a magnetic substance or at least the portion of the side wall of it in contact with the magnet must be composed of the magnetic substance. When the magnets are disposed to the side walls of both the substrates and the attracting force of the confronting magnets is used, the substrates may be composed of any of the magnetic substance and a non-magnetic substance. Further, contact regions of two adjacent substrates may be divided into two portions and the magnets may be disposed to the other portions of the substrates. In this case, at least the portion of a substrate, which confronts with a magnet and comes into contact with the magnet must be composed of the magnetic substance.

A tenth exemplary aspect of the present invention is an information display apparatus characterized by being composed of a thin film flat display formed on a thin film composed of at least one of flexible shape memory alloy, shape memory resin, shape memory alloy fiber, and shape memory resin fiber, a case for accommodating the thin film flat display, an accommodation unit disposed in the case for accommodating the thin film flat display by taking up or folding it, and a heat means for heating the thin film flat display when it is accommodated or unfolded.

An eleventh exemplary aspect of the present invention is an information display apparatus according to any of the eighth to the tenth exemplary aspects of the present invention which is characterized in that the thin film flat display is an organic EL display or an electronic paper. The matters described in third exemplary aspect of the present invention are also applied to the eleventh exemplary aspect of the present invention.

Further, a twelfth exemplary aspect of the present invention is an information display apparatus according to any one of the eighth to the eleventh exemplary aspects of the present invention which is characterized in that a keyboard is disposed to the case. Since the case corresponds to the main rib of the first to the seventh exemplary aspects of the present invention, the matters described in these exemplary aspects of the present invention are also applied to the twelfth exemplary aspect of the present invention.

A thirteenth exemplary aspect of the present invention is an information display apparatus according to any one of the eighth to the twelfth exemplary aspects of the present invention which is characterized in that a computer system for information processing is disposed to the case, and a fourteenth exemplary aspect of the present invention is an information display apparatus according to any one of the eighth to the thirteenth exemplary aspects of the present invention which is characterized in that the case accommodates a microphone, a speaker, and an antenna to permit communication of audio, image or data to the outside.

The description of the sixth and the seventh exemplary aspects of the present invention is also applied to the fourteenth exemplary aspect of the present invention.

A fifteenth exemplary aspect of the present invention is an information display apparatus according to any one of the first to the ninth exemplary aspects of the present invention or the eleventh to the fourteenth exemplary aspects of the present invention which is characterized in that the thin film is composed of at least one of shape memory alloy, shape memory resin, shape memory alloy fiber, and shape memory resin fiber. With this arrangement, when a screen is used, it is possible to enhance flatness and a flatness keeping property of an image surface, whereby a more easily observable image can be provided.

A sixteenth exemplary aspect of the present invention is an information display apparatus according to the fifteenth exemplary aspect of the present invention which is characterized by being composed of a means for heating the thin film. The heat means can enhance flatness and a flatness keeping property when the screen is used, and the screen can be easily folded and taken up when it is accommodated.

The first exemplary aspect of the present invention is the information display apparatus in which at least a part of the fan face of the fan is arranged as the flexible and bendy thin film flat display or the flexible and bendy thin film flat display is disposed to at least a part of the fan face. Accordingly, since the information display apparatus can be carried in a folded state, it can be made to an information display apparatus very excellent in portability regardless that it has the large display screen. Further, since the large screen can be obtained by unfolding the fan in use, usability of the information display apparatus is enhanced.

Further, in the second exemplary aspect of the present invention, the flexible and bendy thin film flat display is disposed to at least a part of the fan face in a flat state so that the mountains of the fan face are joined together when the fan face is unfolded. With this arrangement, when the fan face is unfolded, a flat screen can be obtained regardless that the fan face is made to a wave shape, thereby distortion of the screen can be prevented.

In the third exemplary aspect of the present invention, the arrangement of the invention can be easily realized by composing the thin film flat display, which is formed on the flexible and bendy thin film, of the organic EL display or the electronic paper.

In the fourth exemplary aspect of the present invention, since the keyboard is disposed to the main rib, manipulation for data communication to the outside can be carried out even in a state that the apparatus is closed.

In the fifth exemplary aspect of the present invention, since the keyboards composed of the touch switches are disposed to the intermediate ribs, the keyboards can be easily manipulated while observing a screen in a state that the information display apparatus is unfolded.

According to the sixth and seventh exemplary aspects of the present invention, since the function components are mounted on the main ribs, the information display apparatus of the invention is arranged as an information display apparatus that has many functions as a television, a phone, data communication, a computer, the Internet communication, and the like and is excellent in portability and usability.

According to the eighth exemplary aspect of the present invention, the screen is unfolded flat in use, and, when the screen is carried, it is taken up and accommodated in the case. Accordingly, the apparatus is arranged as an information display apparatus very excellent in portability and usability. In particular, since the screen unfolded in use is made to a rectangular flat surface, an image can be easily observed as well as an efficiency of use of the screen is increased. Further, since the plurality of rectangular substrates are arranged as the flat surface and the thin film flat display is joined onto the flat surface, it can be easily bent inward and cannot be bent outward. With this arrangement, the flat surface keeping property of the thin film flat display is enhanced regardless of its minute thickness. Further, take-up manipulation can be smoothly carried out.

In the ninth exemplary aspect of the present invention, when the thin film flat display is unfolded, since adjacent substrates are attracted by the magnets disposed on the side surfaces of them, the plurality of substrates are made to a single flat sheet. As a result, the thin film flat display on the substrates can keep a flat state when it is unfolded. Further, when the thin film flat display is taken up inward for accommodation, force for separating the substrates against the attracting force of the magnets act on them, whereby gaps are made between adjacent substrates, and thus the substrates can be taken up easily.

In the tenth exemplary aspect of the present invention, when the thin film flat display is accommodated in the case or pulled out from it and unfolded flat, it is thermally deformed so that it can be easily accommodated and unfolded. For example, when a thin film is composed of shape memory resin and super-elasticity is utilized, since the flexibility of the thin film is increased by heat, it can be easily taken up and folded as well as can be easily unfolded flat. Further, after the thin film is unfolded flat, since it is released from heat and cooled, it is made hard and kept in a flat state so that a screen can be easily observed. Further, when shape memory characteristics of shape memory alloy, shape memory resin and fiber (nonwoven fabric) of them are utilized in the thin film flat display and a shape of it when it is unfolded flat is stored to it, it can be unfolded flat and can keep a flat shape. Inversely, when a take-up shape and a folded shape is stored to the thin film flat display, an accommodated state of it can be realized. In this case, since the thin film flat display has flexibility in a cooled state, it can be unfolded into a flat state and has hardness to keep the flat state. With this arrangement, there can be obtained an advantage of making accommodation and unfolding easy.

Further, the eleventh through the fourteenth exemplary aspects of the present invention have the same advantage as the third, fourth, sixth, and seventh exemplary aspect of the present invention. In addition, the flatness and the flatness keeping property of the screen in use can be enhanced and the screen can be more easily accommodated by the arrangement of the fifteenth exemplary aspect of the present invention.

The sixteenth exemplary aspect of the present invention can enhance flatness and accommodation easiness in unfolding by heating and cooling the arrangement of the fifteenth exemplary aspect of the present invention.

BRIEF DESCRIPTION OF THE DRAWINGS

FIG. 16 is a side elevational view showing an inside structure of an information display apparatus according to another embodiment of the present invention.

DETAILED DESCRIPTION OF EXEMPLARY EMBODIMENTS OF THE INVENTION

Detailed descriptions of exemplary embodiments of the invention will be explained. Although the following exemplary embodiments describe the invention, the scope covered by the right of the invention should not be restricted by the concreteness of the embodiments. Further, respective components can be arbitrarily and independently grasped, and inventions from which and to which arbitrary components of claims are deleted and added are also recognized in the description.

Embodiment 1

Figure 1:
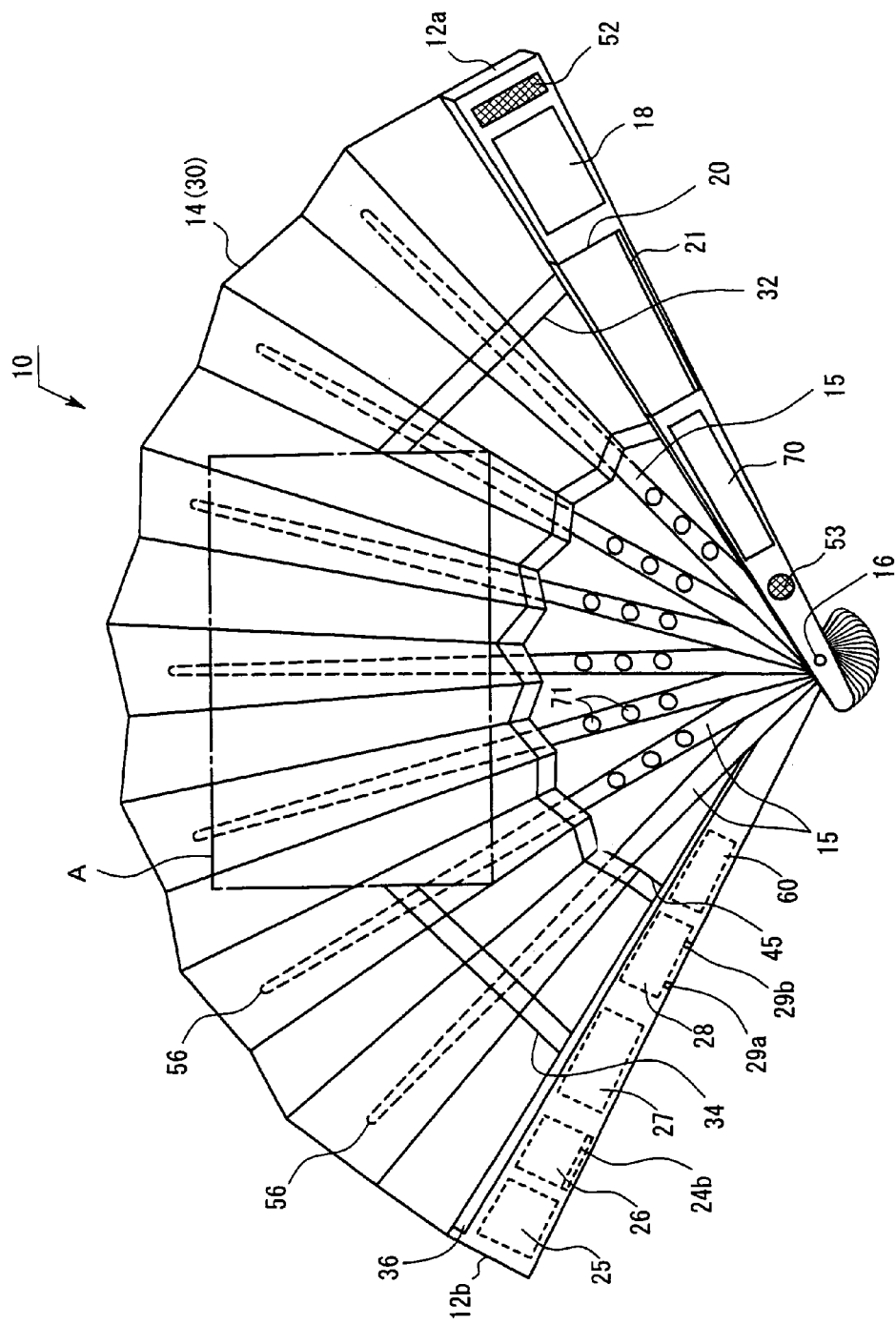
FIG. 1 is a perspective view showing an information display apparatus according to a specific embodiment of the present invention.

FIG. 1 is a perspective view of an information display apparatus 10 according to an exemplary embodiment of the present invention when it is unfolded. A pair of main ribs 12a, 12b are composed of resin, and both the ends of a fan face 14 are joined to the pair of main ribs 12a, 12b. Further, many intermediate ribs 15 are disposed between the pair of main ribs 12a, 12b and turnably bundled by a passing-through shaft 16 in a root portion together with the main ribs 12a, 12b. A pivot of a fan is formed by the passing-through shaft 16. The intermediate ribs 15 are composed of resin or metal. The extreme end portions of the intermediate ribs 15 are joined to the fan face 14. Specifically, the intermediate ribs 15 are joined to ever other wave-shaped faces. Further, in a state in which the information display apparatus 10 is unfolded, although the intermediate ribs 15 are in parallel with the faces of the main ribs 12a, 12b in the root portion, they incline along the inclination of the wave faces of the fan face 15 in the portions of them joined to the fan face 14. That is, since the intermediate ribs 15 have elastic force, they are twisted toward extreme ends.

Figure 2:
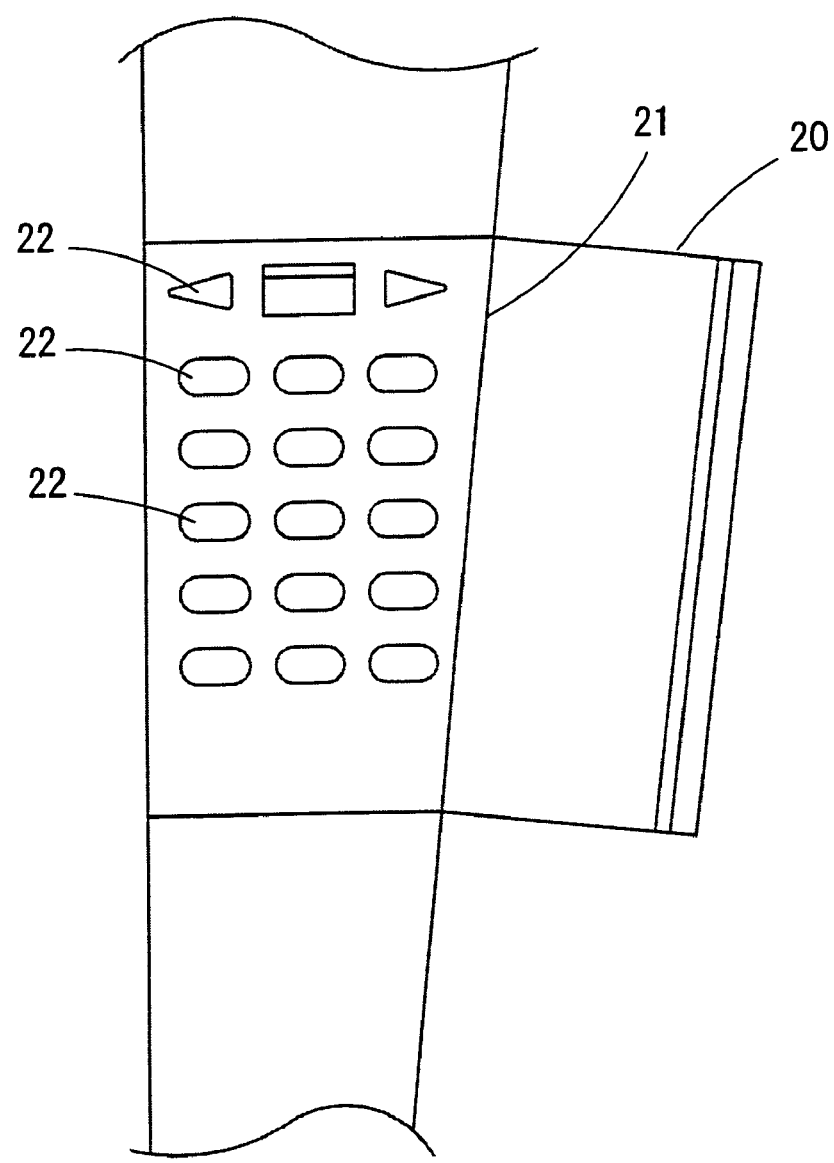
FIG. 2 is a plan view showing a keyboard disposed to a main rib of the apparatus of the embodiment.

Further, to permit manipulation for phone call and transmission/reception of data to be carried out easily in a state in which the information display apparatus 10 is closed, a thin film flat display 18 is disposed on a front surface of the main rib 12a, and a keyboard 22 is disposed in a lid 20 that can be opened and closed using a shaft 21 acting as a turning shaft as shown in FIG. 2.

Figure 3:
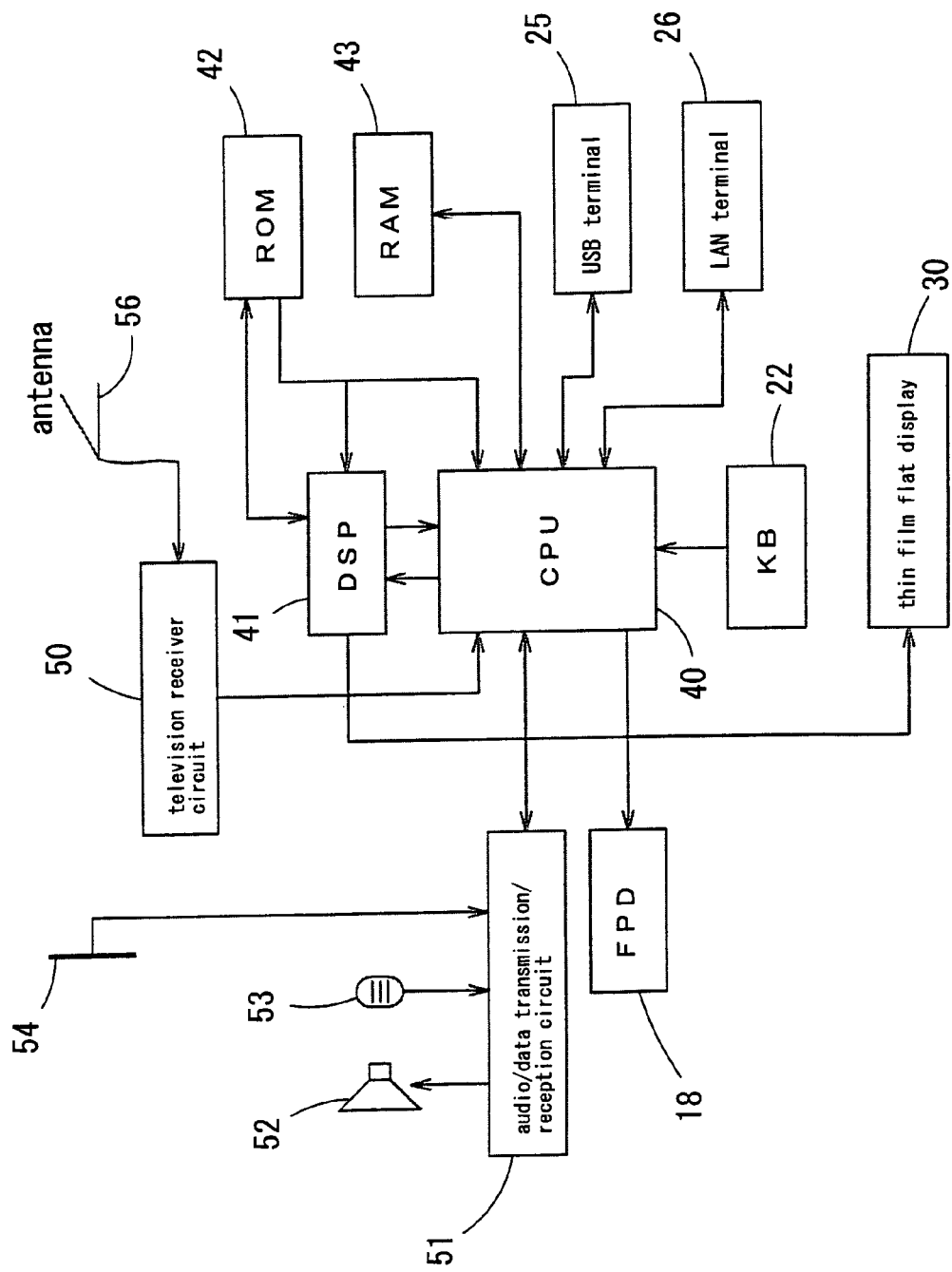
FIG. 3 is a block diagram showing an electric arrangement of the apparatus of the embodiment.

The information display apparatus 10 is electrically arranged as shown in FIG. 3. The information display apparatus 10 is provided with a computer system such as a CPU 40 for information processing, a DSP 41 as an arithmetic operation unit for controlling a screen, a ROM 42 and a RAM 43 for storing data, the keyboard 22 for inputting data, and the like. The information display apparatus 10 is further provided with a thin film flat display 30 on which a display image is created by the DSP 41, the thin film flat display 18 controlled by the CPU 40, a television receiver circuit 50, an audio/data transmission/reception circuit 51, and a speaker 52 and a microphone 53 connected to the circuit 51. Further, a USB terminal 25 for carrying out wired data communication with the outside and a LAN terminal 26 are connected to the CPU 40, an antenna 36 for audio and data communication is connected to the audio/data transmission/reception circuit 51, and an antenna 56 for receiving television signals is connected to the television receiver circuit 50.

The portions on which these components are mounted will be explained. The computer system such as the CPU 40, the ROM 42, the RAM 43, the television receiver circuit 50, and the audio/data transmission/reception circuit 51 are composed of an integrated circuit 70 and disposed in the main rib 12a. The speaker 52 is disposed to the upper end of the main rib 12a, and the microphone 53 is disposed to the root portion of the main rib 12a.

In contrast, a battery 28, an external memory 27 (a combination of a single or plural IC memories, bubble memories, fixed discs, and the like), an IC tag 60 (IC card and the like), and an antenna 36 are disposed in the other main rib 12b, and the USB terminal 25, the LAN terminal 26, charge terminals 29a, 29b are disposed on a side surface 24 of the main rib 12b. Further, transmission of signals and power between the respective units disposed to the main rib 12b and the respective units disposed to the main rib 12a is realized by a flat cable 45 formed to a part on a lower surface of the fan face 14. Further, the television antenna 56 is composed of two intermediate ribs, two signal lines formed to the passing-through shaft 16 are connected to the antenna 56 which is connected to the integrated circuit 70 disposed in the main rib 12a through the signal lines. In addition to the above, a not shown digital camera and digital voice recorder are disposed to the main rib 12a.

Figure 4:
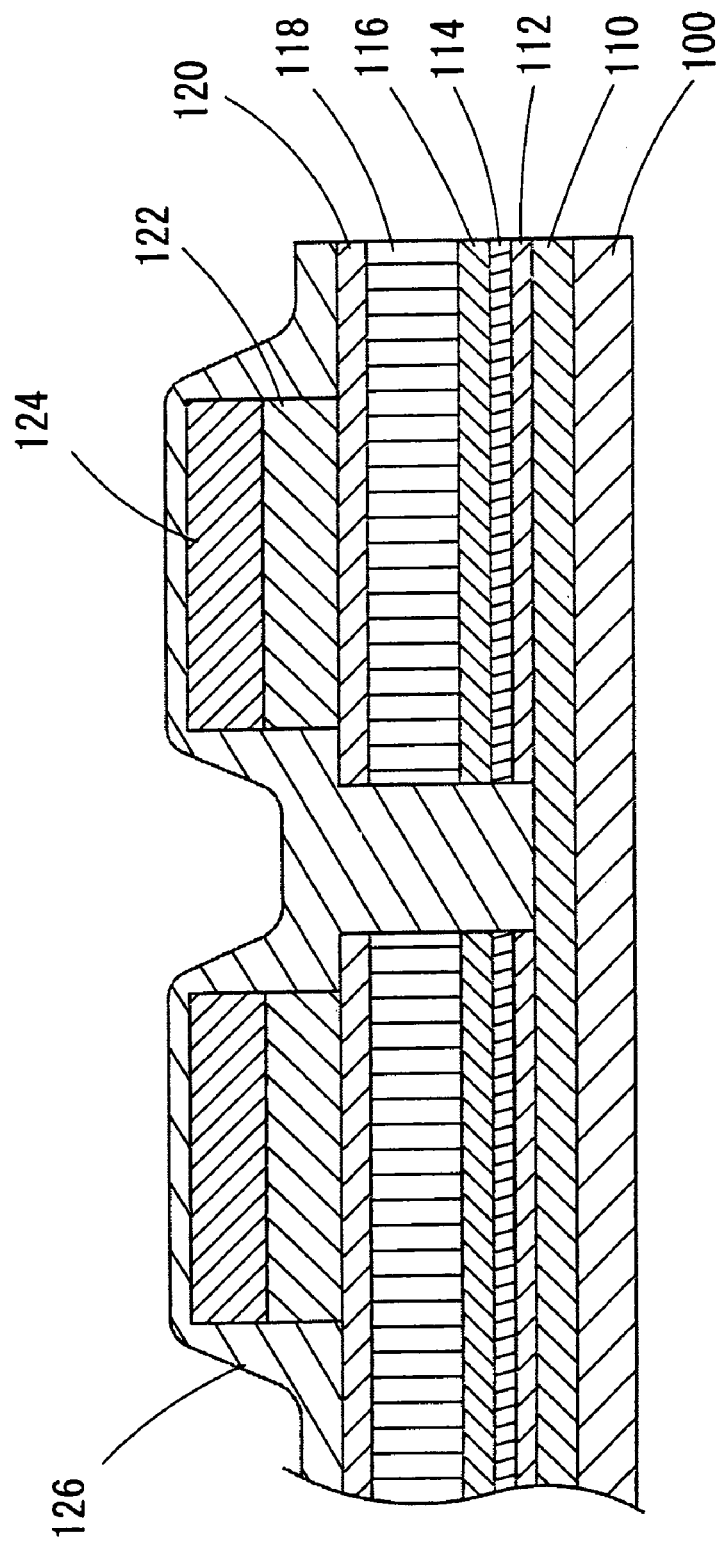
FIG. 4 is a sectional view showing an arrangement of an organic EL flat display used in the apparatus of the embodiment.

In the embodiment, the fan face 14 is a thin film organic EL display formed on a flexible and bendy thin film. As shown in FIG. 4, the organic EL display has a cathode 110 composed of Mg, Li alloy, etc., an electron injection layer 112, an electron transportation layer 114, a hole block layer 116, a light emitting layer 118, a hole transportation layer 120, a hole injection layer 122, and an anode 124 composed of ITO (indium tin oxide) which are layered on a thin film 100 in this order. The cathode 110 is composed of many strip-shaped (parallel with the paper sheet) electrodes, and the anode 124 are composed of many strip-shaped (vertical to the paper sheet) electrodes. Further, a transparent resin film 126 is formed on the entire surface of the organic EL display to protect it. FIG. 4 shows only two pixels of the display. These layers are formed by vacuum evaporation using a metal mask. Further, it is also possible to use a thin film forming method using ion and radical together with plasma of a material gas. Further, it is also possible to use Japanese paper in place of the thin film 100.

Note that an organic material may be a low molecular organic substance or a high molecular organic substance. When the low molecular organic substance is used, the films are formed by the vacuum evaporation. However, when the high molecular organic substance is used, a spin coating method may be used in which after melted polymer is dropped onto a substrate, a uniform film is formed on the substrate by rotating the substrate. Further, when the high molecular organic substance is used, it is also possible to compose the organic EL display of only the light emitting layer or only the light emitting layer and the hole injection layer.

Further, to realize full color, it is sufficient to separately carry out evaporation for each display unit using organic substances added with dyes of R, G, B as masks. For example, when it is assumed that FIG. 4 shows a full color display, FIG. 4 shows only two light emitting regions of R, G, B light emitting regions. In a full color display apparatus using a polymer material, there is used a method of forming films at predetermined light emitting points by ink-jetting liquids composed of organic substances added with R, G, B dyes. Further, an ink print method can be also used.

A material used as the display 18 is composed of a metal complex, for example, heavy metal ions of iridium, platinum, and the like and rare earth metal ions of terbium, europium, cerium, and the like disposed at a center and an organic substance (ligand) coupled with them around them.

Since the materials and the manufacturing methods of the other organic EL displays are disclosed in detail in the patent documents described above, the methods disclosed in them can be used. In contrast, the thin film flat display used in the information display apparatus of this exemplary embodiment of the present invention has a feature in that an organic EL thin film flat display is formed on a flexible and bendy thin film 100. Accordingly, since citation of the patent documents 1 to 9 that disclose the manufacturing methods is sufficient to explain the manufacturing method of the organic EL display in detail, requirements for embodying the description can be satisfied by the patent documents.

In FIG. 1, a screen is designed in a rectangular region shown by a region A. Signal lines 32, 34 are formed in the portion other than the rectangular region A to connect between the main ribs 12a, 12b and electrodes in the rectangular region A and to control display of pixels. With the above arrangement, an image is displayed on the rectangular region A under the control of the DSP 41. Further, the CPU 40 detects a manipulation input from the keyboard 22 and carries out a processing according to the manipulation. Since the antenna 36 is disposed in the main rib 12b, transmission and reception of audio and data to and from the outside can be made possible. Further, it is possible to receive television signals by the television antenna 56 composed of the intermediate ribs and to display a video in the image region A.

Further, a keyboard 71 may be disposed to the root portions of intermediate ribs 15. In this case, it is preferable to form recesses on the surfaces of the intermediate ribs 15 and to form the keyboard by disposing membrane switches and the like in the recesses so that the surface of the keyboard 71 does not project from the surfaces of the intermediate ribs 15.

Figure 5:
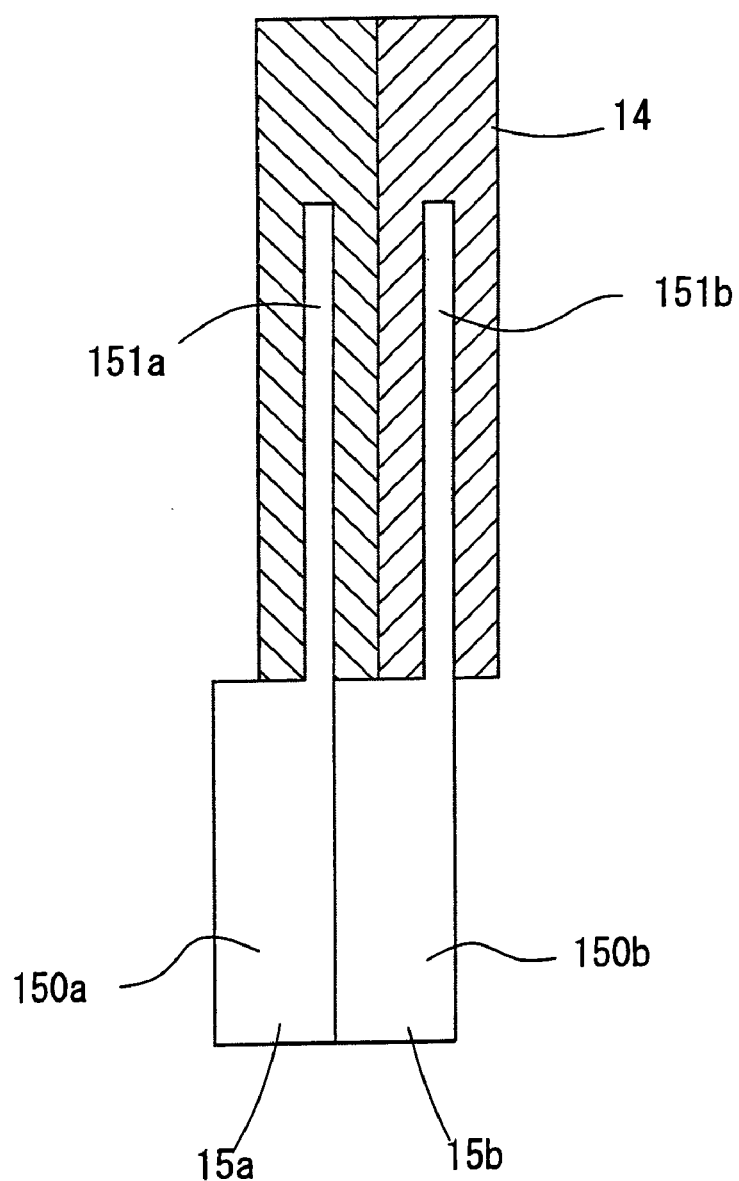
FIG. 5 is a sectional view showing a relation between intermediate ribs and a fan face of the apparatus of the embodiment.

Further, as in FIG. 5, to sufficiently accommodate the folded fan face between adjacent intermediate ribs 15a, 15b, it is preferable to form root portions 150a, 150b of the intermediate ribs 15a, 15b thick and to form portions 151a, 151b to which the fan face 14 is joined thin. With this arrangement, the fan face 14 can be smoothly opened and closed. Further, although the fan face 14 is made to a fan shape as shown in FIG. 1 when it is unfolded, the upper side of the fan face 14 may be made straight when it is unfolded. That is, the fan face 14 may be formed such that a length in the intermediate rib direction of it is increased toward both the edges of the fan face 14 from the center of it. With this arrangement, since a large rectangular region can be obtained when the fan face 14 is unfolded, the area of the image region A can be increased. Further, although the fan face 14 itself is arranged as the organic EL flat display, a rectangular organic EL display may be joined to the image region A on the fan face 14 and may be folded together with the fan face 14.

According to the information display apparatus 10 of this exemplary embodiment, since the screen can be folded, the apparatus 10 can be carried conveniently, and since the screen can be unfolded flat in use, a large screen can be obtained and thus usability is enhanced. First, the apparatus of the exemplary embodiment can be used as a computer that can carry out communication. Second, the apparatus can be used as a television receiver. Third, the apparatus can be used as a mobile phone. Fourth, the apparatus can be also used for automatic payment in a ticket gate of transport facilities and in a bank account, as an electronic money card, a resident-registry card, an automatic ticket gate card of transport facilities, a distribution tag, and the like each making use of the IC tag 60. Fifth, the apparatus can be used for photographing by a digital camera, voice recording by a digital voice recorder, and the like, and moreover recorded data can be easily edited using the large screen. As described above, the apparatus can be used as an intelligent terminal with enhanced portability and usability.

Embodiment 2

Figure 6:
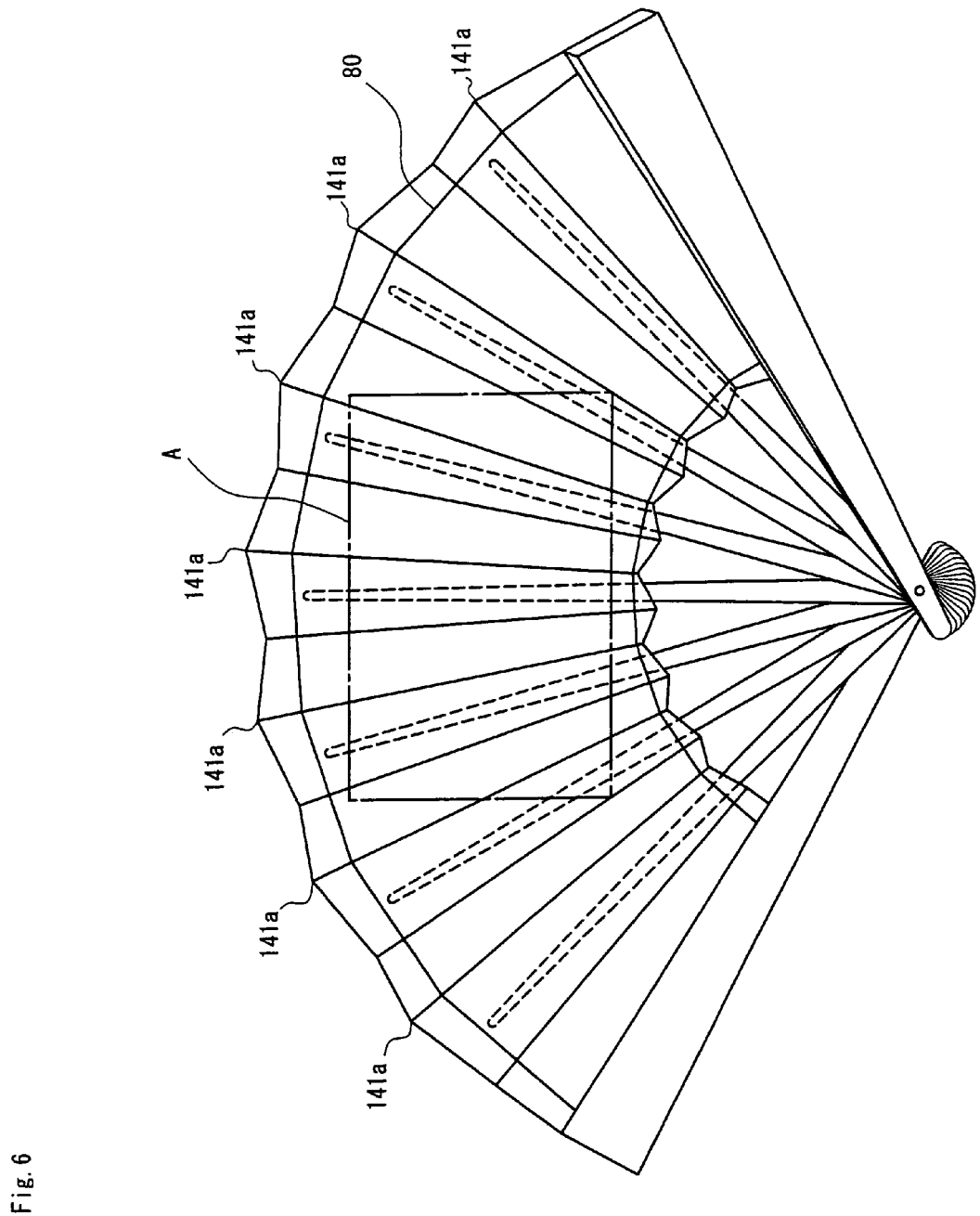
FIG. 6 is a perspective view showing an information display apparatus according to another embodiment of the present invention.
Figure 7:
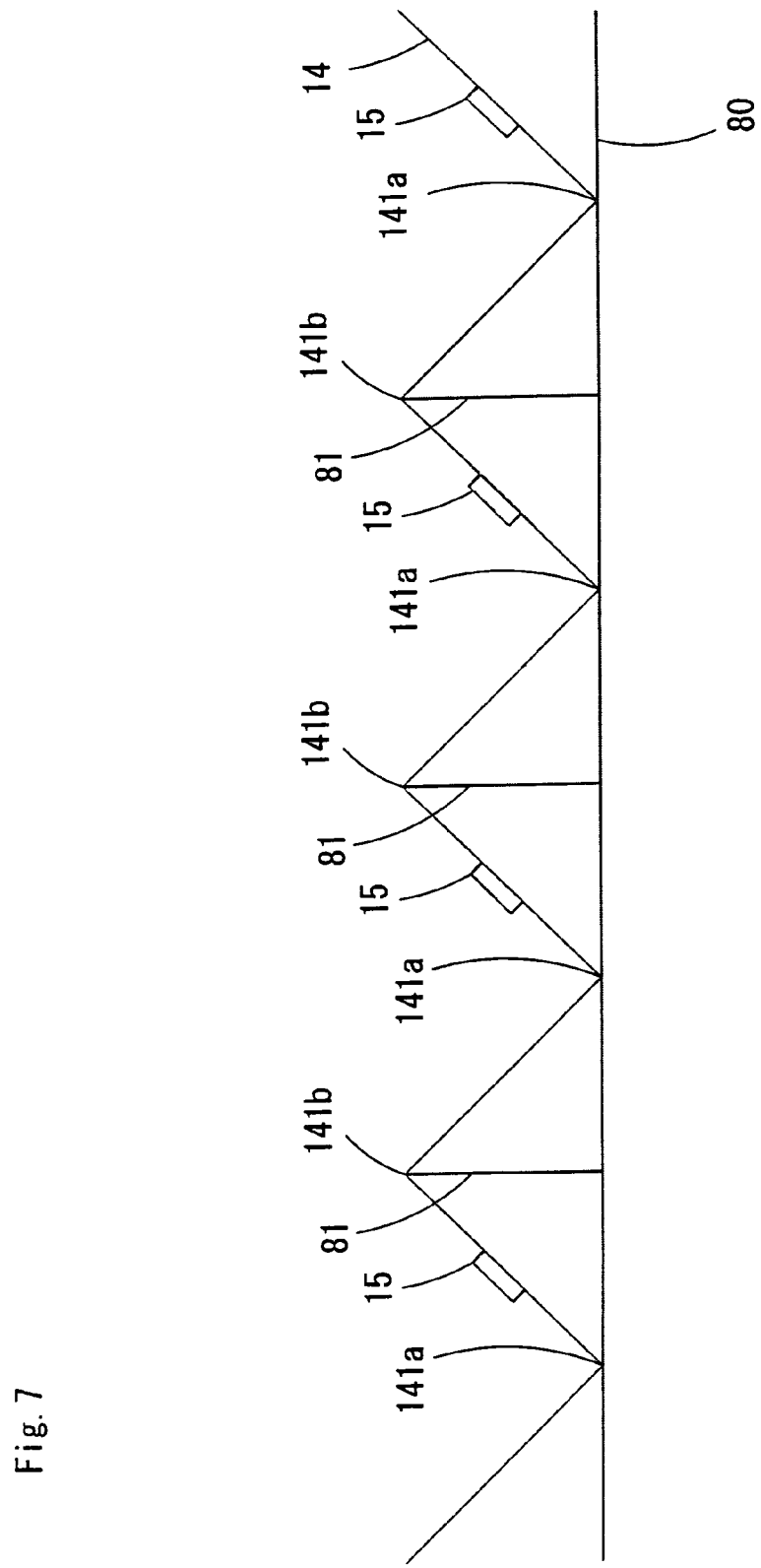
FIG. 7 is a sectional view showing a relation between a fan face of the apparatus of the embodiment and an organic EL flat display.
Figure 8:
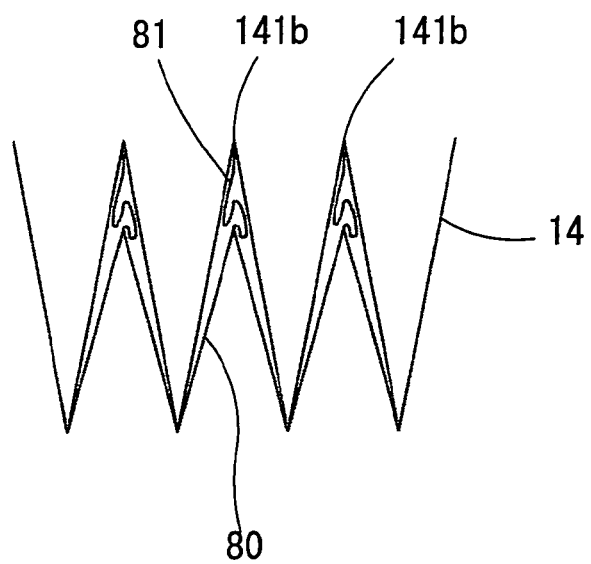
FIG. 8 shows a behavior of the organic EL flat display when the fan face is folded.

In the second exemplary embodiment, an organic EL flat display is joined to mountains of the fan face 14 in the first exemplary embodiment. FIG. 6 is a perspective view, and FIG. 7 is a sectional view along an arc of FIG. 6. As shown in FIG. 6, the fan-shaped organic EL flat display 80 manufactured by the above method is provided so as to be joined to ridges lines 141a of all the mountains of the fan face 14. An image region A is the same as the first exemplary embodiment. A back surface of the organic EL flat display 80 is connected to valleys 141b of the fan face 14 through strings 81. The strings 81 may be disposed at a plurality of portions along a lengthwise direction of intermediate ribs 15. The strings 81 are stretched straight when the fan face 14 is unfolded flat. When the fan face 14 is folded, since the valleys 141b are made deep as shown in FIG. 8, the strings 81 pull the organic EL flat display 80 from the back surface in a direction of the valleys 14 1b. As a result, since the organic EL flat display 80 is folded toward the valleys 141b at an initial time of start of folding of the fan face 14, it is smoothly folded to the valley portions of the fan face 14 by a subsequent folding operation.

Embodiment 3

Figure 9:
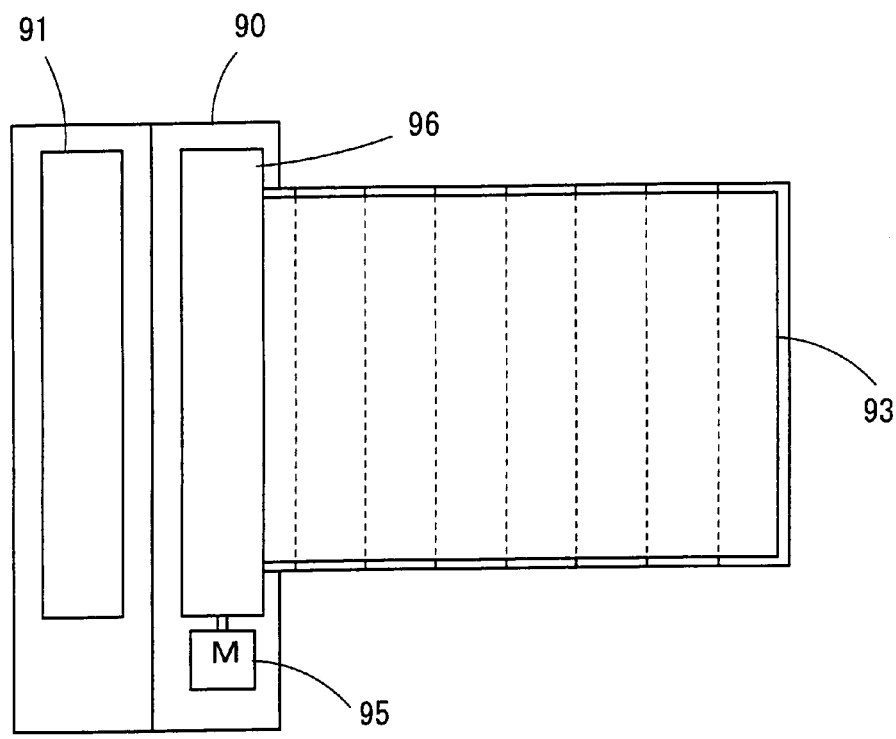
FIG. 9 is a plan view showing an information display apparatus according to another embodiment of the present invention.
Figure 10:
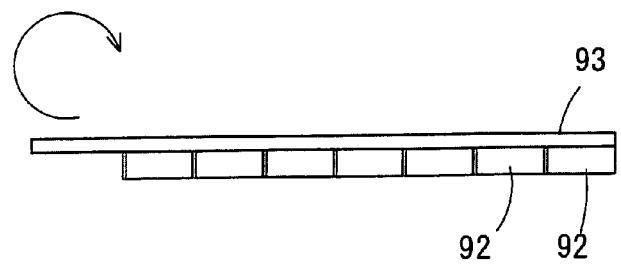
FIG. 10 is a sectional view showing a relation between a substrate of the apparatus of the embodiment and an organic EL flat display.
Figure 12:
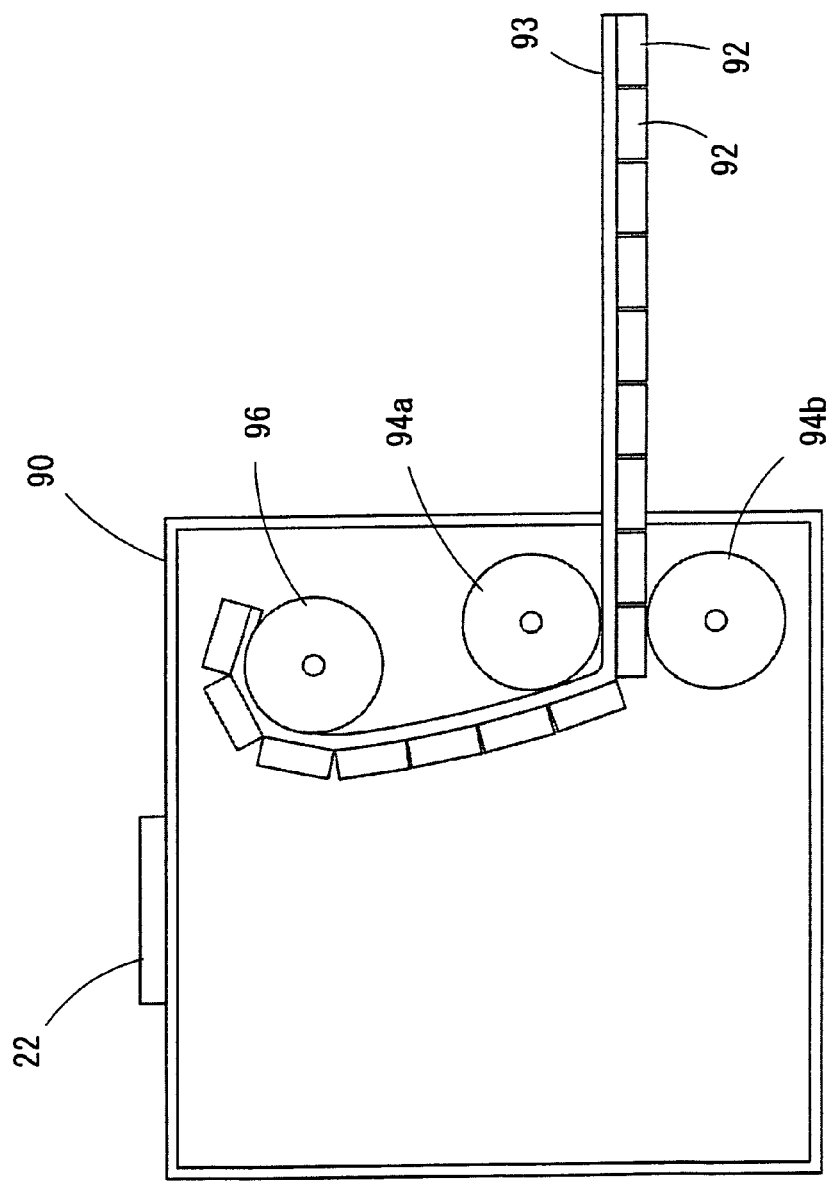
FIG. 12 is a side elevational view showing a mechanism for accommodating the organic EL flat display in the apparatus of the embodiment.
Figure 13:
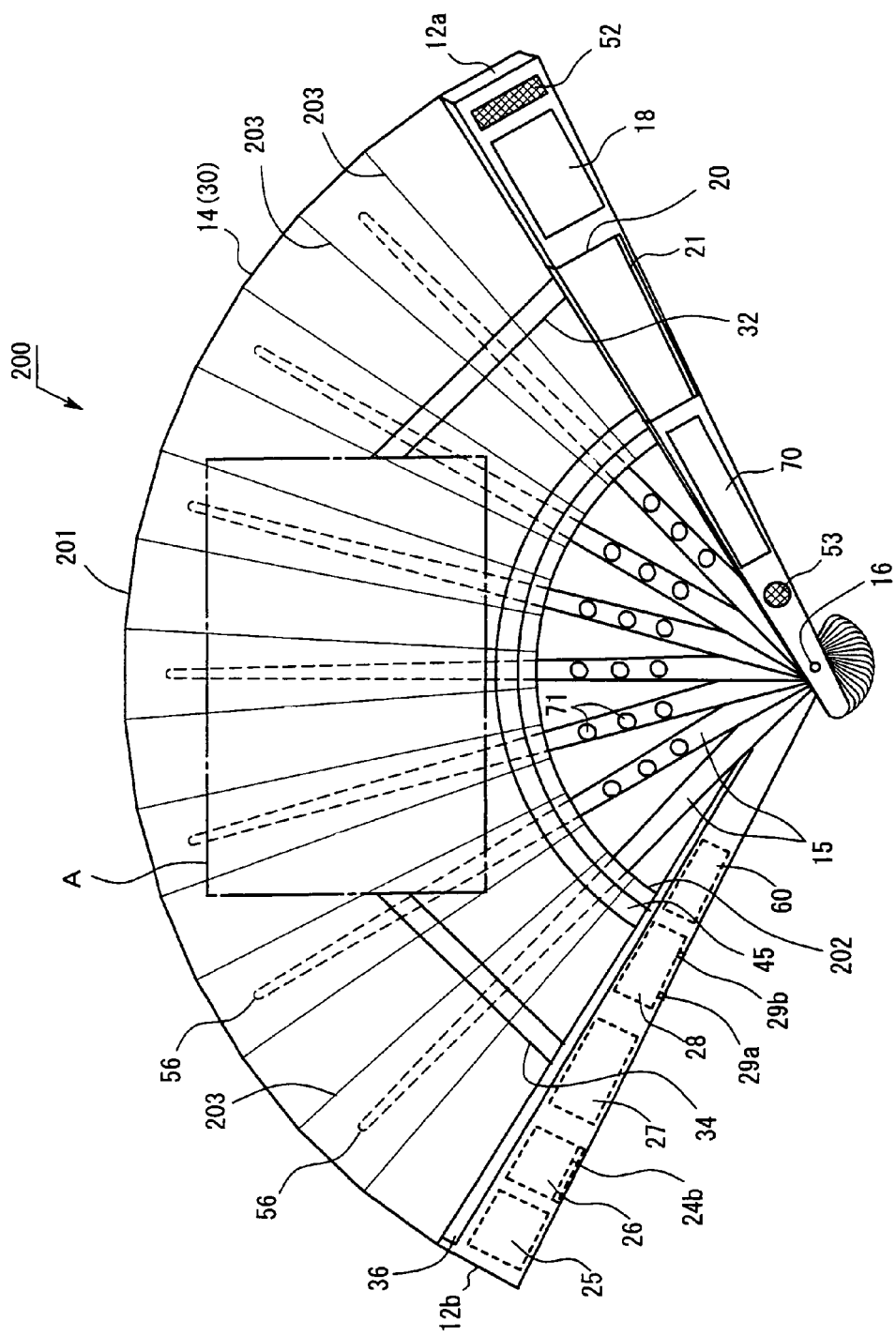
FIG. 13 is a perspective view showing an information display apparatus according to another embodiment of the present invention.
Figure 14:
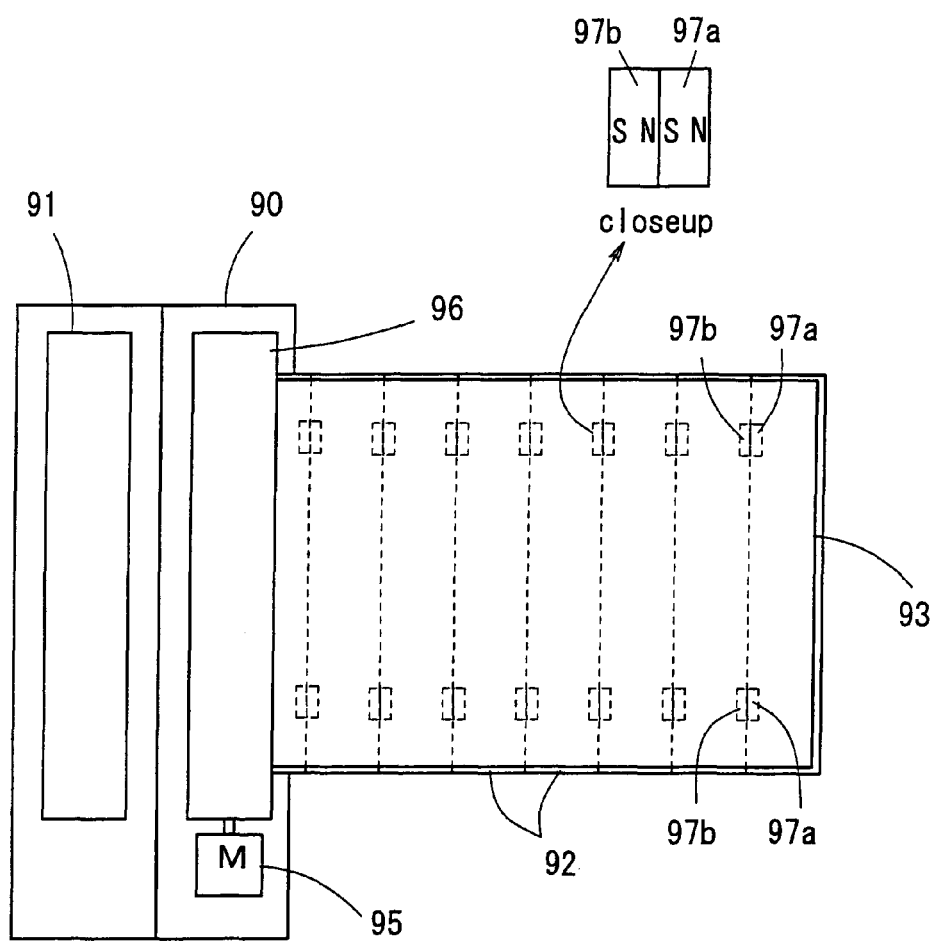
FIG. 14 is a perspective view showing an information display apparatus according to another embodiment of the present invention.

As shown in FIGS. 9 and 12, an information display apparatus of the third exemplary embodiment has a case 90 as a main body disposed to it, and a keyboard 22 is formed on an upper surface of the case 90 as shown in FIG. 12. The same units as those disposed in the main ribs 12a, 12b shown in the first exemplary embodiment are disposed in the case 90. These units are collectively shown by 91 in FIG. 9. As shown in FIG. 10, many strip-shaped rigid substrates 92 composed of resin are disposed adjacent to each other in a flat state. Then, a rectangular organic EL flat display 93 is joined onto the flat sheet.

Figure 11:
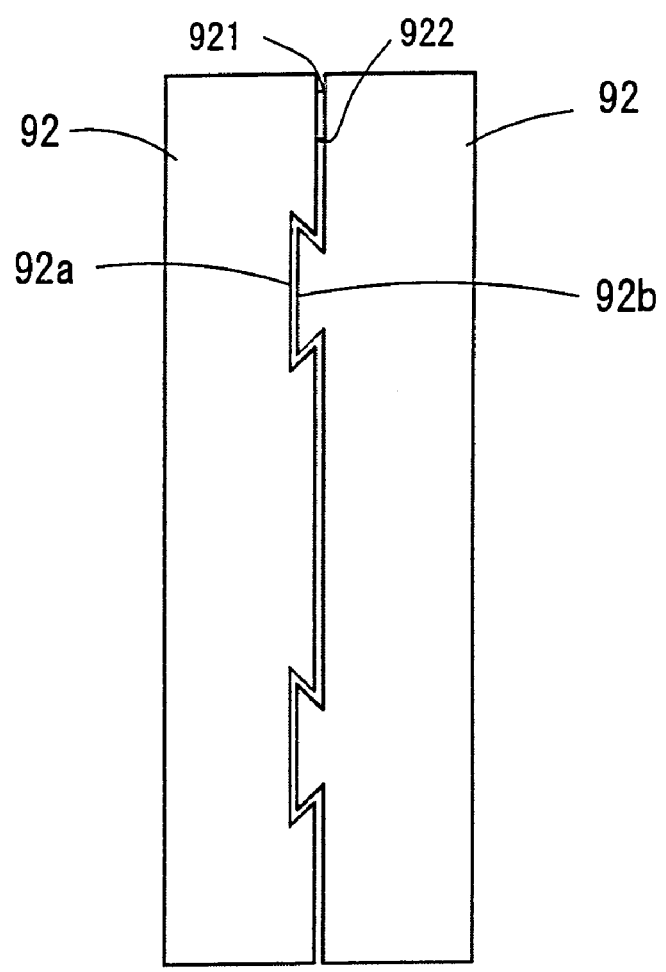
FIG. 11 is a plan view showing an engagement mechanism for engaging adjacent substrates of the apparatus of the embodiment.

Further, as shown in FIG. 11, a concave portion 92a and a convex portion 92b are formed on side surfaces 921, 922 of two adjacent substrates 92, 92. The concave portion 92a and the convex portion 92b are formed to an arc shape on the sides thereof in a turn direction so that the substrates can be turned smoothly with a contact line between the substrates 92, 92 on the organic EL flat display 93 side facing inward. The organic EL flat display 93 is also unlike to bent in an upward direction (convex in an anti-vertical direction) due to the engaging action of the concave portion 92a and the convex portion 92b in a state in which the organic EL flat display 93 is unfolded. With this arrangement, the organic EL flat display 93 is made stable in a flat shape when used, and thus usability can be enhanced.

Further, the organic EL flat display 93 is accommodated in the case 90 by taking up it around a turning shaft 96 by the rotating force of a motor 95 with the inside surface of the display 93 facing inward. Further, a pair of rubber rollers 94a, 94b are disposed to the inlet of the case 90 so that elasticity is applied by clamping the substrates 92 and the organic EL flat display 93 joined to them between the pair of rubber rollers 94a, 94b. With this arrangement, when the organic EL flat display 93 is taken up, the engagement between the concave portion 92a and the convex portion 92b of the substrate 92 can be easily loosened. Further, when the organic EL flat display 93 is unfolded flat, the concave portion 92a and the convex portion 92b of the substrate 92 are engaged with each other by the press force of the rollers 94a, 94b.

Embodiment 4

Portions achieving the same functions as the first exemplary embodiment are denoted by the same numerals. In the embodiment, a fan face 14 is arranged such that when it is unfolded, it is made to a flat surface in place of a wave surface. The fan face 14 has an outer peripheral portion 201 and an inner peripheral portion formed to concentric arcs about a passing-through shaft 16 constituting a pivot. Then, all the broken lines of the fan face 14 are arranged in a direction toward the passing-through shaft 16. With this arrangement, when the fan face 14 is unfolded, it can be made to a flat surface. As a result, an image formed on an image region A can be more easily observed. The other arrangement is the same as the first exemplary embodiment.

Embodiment 5

The fifth exemplary embodiment has the same arrangement as the third exemplary embodiment. Many strip-shaped rigid substrates 92 are disposed flat adjacent to each other, and a rectangular organic EL flat display 93 is joined onto the flat sheet. Magnets 97a are fixed to two portions of the respective adjacent side surfaces of adjacent substrates 92, and magnets 97b are fixed to two portions corresponding to the above two portions of the side surfaces. These magnets 97a, 97b are buried in concave portions formed to the confronting side walls of the respective substrates 92, 72. Then, the side wall surfaces of the substrates 92, 92 and the surfaces of the magnets 97a, 97b constitute the same surface. The confronting surfaces of these confronting magnets 97a, 97b are composed of a different magnetic pole so that attraction force acts to each other. As a result, when the organic EL display 93 is unfolded to the outside of a case 90, the plurality of substrates 92 can be kept flat by the action of the magnets. That is, a series of the plurality of substrates 92 are formed to a flat surface and can be bent neither upward nor down.

When the organic EL flat display 93 is taken up into the case 90, since bending force acts on the magnets 97a, 97b in a direction orthogonal to the attracting force by the action of rollers 94a, 94b and a turning shaft 96 shown in FIG. 12, these magnets can be easily bent against the attracting force. That is, force of the magnets is not applied in a direction orthogonal to the attracting force of them, a direction of the two magnets 97a, 97b can be easily changed. Note that the substrates 92 may be composed of a magnetic substance such as stainless steel and the like in place of resin. With this arrangement, joint force between adjacent substrates can be enhanced even if the magnets 97a, 97b have weak magnetic force. Although the magnets 97a, 97b are used to parts of the substrates, they may be bonded onto the entire side walls of the substrates. Further, anisotropic rare earth bonded magnet (plastic magnet) may be used as the magnets. In this case, a large amount of holding force can be obtained by a small amount of the light weight magnet.

Embodiment 6

Figure 15:
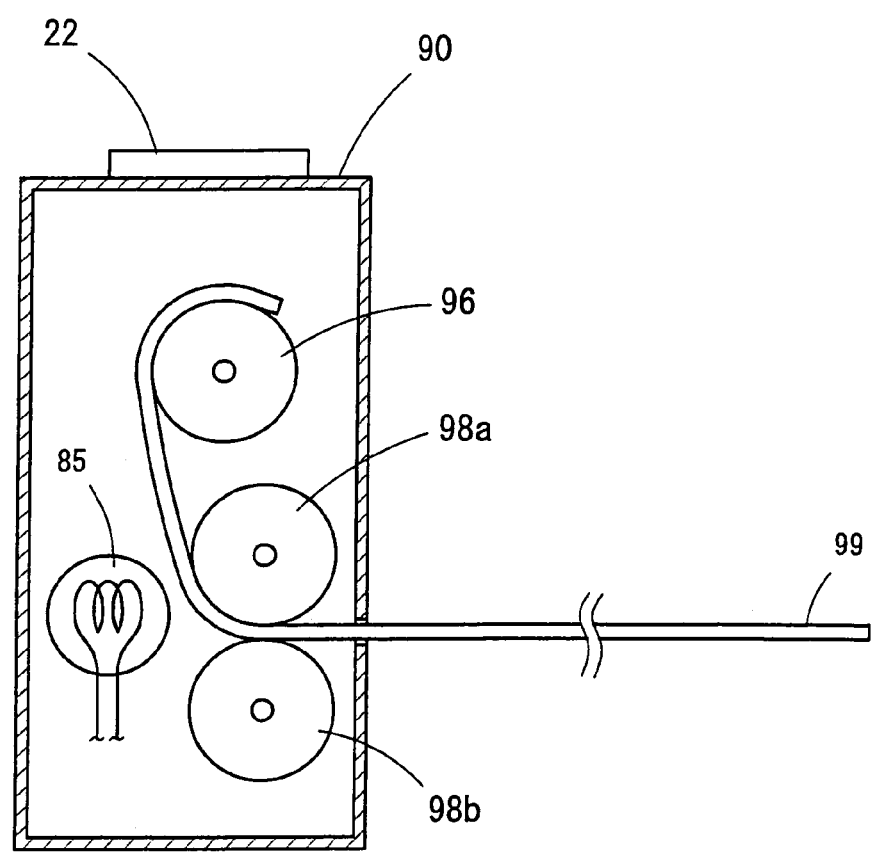
FIG. 15 is a side elevational view showing an inside structure of an information display apparatus according to another embodiment of the present invention.

The sixth exemplary embodiment has the same arrangement as the third exemplary embodiment. In the sixth exemplary embodiment, an organic EL flat display 99 is composed of a shape memory resin film 100 in place of the thin resin film 100 of FIG. 4 and arranged to have the same structure as that shown in FIG. 4. The organic EL flat display 99 has no substrate 92. As shown in FIG. 15, two rollers 98a, 98b and a turning shaft 96 are arranged as heating rollers. A nichrome wire, a lamp, and a Peltier effect device can be used to heat them. In the embodiment, the two rollers 98a, 98b, the turning shaft 96, and the thin resin film 100 are heated using a lamp 85. When the organic EL flat display 99 is unfolded or taken up, the shape memory resin film 100 is heated to a transition point temperature by heating the turning shaft 96 and the rollers 98a, 98b. Thus, since the shape memory resin film 100 is softened by being heated, its shape is easily changed along the circular shape of the roller 98a and the turning shaft 96. As described above, the shape memory resin film 100 can be taken up around the turning shaft 96 and accommodated while changing its shape.

Further, when the shape memory resin film 100 is unfolded, the turning shaft 96 and the rollers 98a, 98b are heated likewise, thereby the shape of the shape memory resin film 100 is easily changed so that it can be unfolded by human power. The shape memory resin film 100 is unfolded into a flat state as well as keeps this state by being cooled. With this action, the organic EL flat display 99 can be made to a fixed flat sheet, thereby an image recognizing property is greatly enhanced, and the display can be easily handled when it is used. Further, when the organic EL flat display 99 is accommodated, it can be easily taken up because its shape can be easily changed.

A shape memory alloy thin sheet may be used in place of the shape memory resin film 100. Since the organic EL flat display 99 has flexibility at an ordinary temperature by using the shape memory alloy thin sheet, it can be easily unfolded and accommodated. When the organic EL flat display 99 is heated by being supplied with power, in an unfolded state, it can be made to a flat state stored by the shape memory alloy thin sheet. Thereafter, even if the power is shut off and the organic EL flat display 99 is lowered to the ordinary temperature, since the shape memory alloy thin sheet keeps the flat state unless unreasonable external force is applied, a flat surface keep property can be enhanced. As a result, there can be provided a flat image that can be easily observed. When the shape memory alloy is heated by the turning shaft and the rollers as described above, it is heated only when unfolded flat. Further, when an arrangement for disposing a heater on the back surface of the shape memory alloy thin sheet and supplying power to it is employed, the shape memory thin sheet is heated after it is unfolded flat.

Embodiment 7

In the seventh exemplary embodiment, accommodation by folding is employed in place of the accommodation by take-up of the sixth exemplary embodiment. As shown in FIGS. 16-A, B, four shaft-shaped fixed rollers 87, three shaft-shaped moving rollers 88, three springs 89 for urging the moving rollers 88 in an X-axis direction, and a heater 86 are disposed in a case 90. As shown in the figures, an organic EL flat display 99 is alternately engaged with the respective rollers. The moving rollers 88 are disposed such that they are guided by a groove (not shown) formed on an inside wall of the case 90 in the X-axis direction and can be moved in the X-axis direction by the urging force of the springs 89. A left end of the organic EL flat display 99 is bonded to the leftmost fixed roller 87. With this arrangement, when the organic EL flat display 99 is unfolded, it does not move in an unfolding direction. Although the heater 86 is an arbitrary heater such as a heater, a lamp, and the like, it is disposed on an inside wall at an upper end of the case 90. FIG. 16-A shows an accommodating state, and FIG. 16-A shows an unfolding state. When power is supplied to the heater 86 and the organic EL flat display 99 is heated, a thin film, which acts as a base of the display and is composed shape memory resin, is softened, thereby the three moving rollers 88 are moved in the X-axis direction by the urging force of the springs 89. With this operation, the organic EL flat display 99 is folded to a bellows state. Thereafter, when power to the heater 86 is shut off, the organic EL flat display 99 is cooled and keeps a shape of FIG. 16-A.

When the organic EL flat display 99 is unfolded flat in use, power is supplied to the heater 86 so that the organic EL flat display 99 is heated and softened. In this state, when a grip 79 disposed at the right end of the organic EL flat display 99 is grasped and the display is pulled externally by human power, the moving rollers 88 are moved in a −X-axis direction against the urging force of the springs 89. Next, when the power to the heater 86 is shut off, the organic EL flat display 99 is cooled and hardened, thereby it keeps an unfolded flat state as shown in FIG. 16-B. At the time, since a degree of hardeness of the thin film exceeds the urging force of the springs 89, the moving rollers 88 do not move in the X-axis direction. As a result, since the organic EL flat display 99 is fixed in the flat state, a sharp flat image can be obtained.

Further, shape memory alloy is used for the thin film, and a state of the organic EL flat display 99 accommodated in the bellows state as shown in FIG. 16-A is set as a shape memory state at a high temperature. Since the shape memory alloy is soft at a room temperature, the organic EL flat display 99 can be unfolded to a flat state as shown in FIG. 16-B. Since the flat state is kept unless excessive force is applied, the organic EL flat display 99 can keep the flat state, thereby a sharp flat image can be obtained. When power is supplied to the heater 86 in accommodation, the organic EL flat display 99 returns to the stored state shown in FIG. 16-A, thereby it is accommodated in the case 90.

On the contrary, it is also possible to make the shape stored state at a high temperature to an unfolded flat state as shown in FIG. 16-B. In this case, the organic EL flat display 99 can be unfolded flat by heating the heater 86 because the stored shape is restored. Then, the organic EL flat display 99 is used while supplying power to the heater 86 or at a room temperature by shutting off power. When power is shut off, it is sufficient to provide stoppers for stopping movement of the moving rollers 88 so that the urging force of the springs 89 does not act on the moving rollers 88 in the X-axis direction. That is, the moving rollers 88 are arranged to move forward and backward from the side wall surface of the case 90, and concave portions formed to end surfaces of the moving rollers 88 are engaged with the stoppers. In accommodation, no heating is carried out. The moving rollers 88 are disengaged from the stoppers and moved in the X-axis direction by the urging force of the springs 89, thereby the organic EL flat display 99 can be folded into the bellows state and accommodated.

Embodiment 8

A shape memory resin film and a shape memory alloy thin film may be used in place of the thin film of the first, second, and fourth exemplary embodiments. Then, a heater wiring may be disposed to the fan face 14 and supplied with power so that the fan face can be heated. Further, the intermediate ribs 15 may be arranged as a heater and supplied with power so that the fan face 14 can be heated. With this arrangement, when the fan face 14 is heated by supplying power in a state that it is unfolded by human power, it can be unfolded into a stored flat surface, thereby the fan face 14 can transit from a wave shape to a flat surface. That is, the folds of the fan face 14 disappear. In this state, heating is stopped by shutting of power, and the fan face 14 is used as a display. When a folding operation of the fan face 14 is not carried out, the fan face 14 keeps a predetermined flat state even if a temperature drops unless external force is not applied thereto, and thus there is not any fault when the fan face 14 is used as the display.

Next, the use of the fan face 14 is ended and the fan face 14 is accommodated in the bellows state, it is sufficient to fold the fan face 14 by applying external force to the main ribs 12*a*, 12*b* so that the fan face 14 of the fan can be accommodated. Since the shape memory resin film and the shape memory alloy thin film have flexibility at a room temperature, they can be easily folded. As described above, when the fan face 14 is unfolded, since the flat state from which the wave shape disappears can be obtained, image quality can be enhanced.

Further, when the thin film 100 is composed of the shape memory resin and super elasticity of the resin is used, the fan face 14 is cooled after it is unfolded into the flat state so that the wave shape disappears in a heated state, thereby the thin film flat display 100 unfolded into the flat state is solidified and fixed. The fan can be accommodated by being folded into the bellows state while being provided with flexibility by heating. As described above, a problem of accommodation in a bent state and flatness in an unfolded state can be overcome.

The modes of use of the shape memory alloy, shape memory resin, shape memory alloy fiber, shape memory resin fiber, and the like are only examples, and the present invention is by no means restricted to the modes of use. It is sufficient to realize transition between two shapes, that is, the bent shape and the flat shape according to the characteristics of these function materials.

What is claimed is:

1. An information display apparatus comprising:
   a thin film flat display formed on a flexible thin film, said thin film flat display being a full color organic EL display capable of displaying a full color image;
   hold means for holding the thin film flat display from a back surface such that it is joined to front surfaces of a plurality of rigid rectangular substrates when they are arranged in parallel on a flat surface;
   a case for accommodating the thin film flat display; and
   a take-up unit disposed in the case for taking up and accommodating the thin film flat display together with the hold means in the case using a direction parallel with long sides of the rigid rectangular substrates as an axis,
   wherein at least one of two confronting side walls of adjacent substrates of said rigid rectangular substrates comprises a magnet, and
   wherein two of said adjacent substrates are connected by a magnetic force of said magnet such that a flat plane is formed when said thin film flat display is expanded.

2. An information display apparatus according to claim 1, wherein the case comprises a keyboard.

3. An information display apparatus according to claim 1, wherein the case comprises a computer system for information processing.

4. An information display apparatus according to claim 1, wherein the case accommodates a microphone, a speaker, and an antenna to permit outside communication of audio, image or data.

5. An information display apparatus comprising:
   a thin film flat display formed on a flexible thin film, said thin film flat display being a full color organic EL display capable of displaying a full color image;
   hold means for holding the thin film flat display from a back surface such that it is joined to front surfaces of a plurality of rigid rectangular substrates when they are arranged in parallel on a flat surface;
   a case for accommodating the thin film flat display; and
   a take-up unit disposed in the case for taking up and accommodating the thin film flat display together with the hold means in the case using a direction parallel with long sides of the rigid rectangular substrates as an axis,
   wherein adjacent substrates of said rigid rectangular substrates comprise confronting side walls,
   wherein one of said confronting side walls comprises a concave portion,
   wherein an other of said confronting side walls comprises a convex portion, and
   wherein said convex portion is engaged with said concave portion such that an arc shape is formed in a direction of the take-up unit.

6. An information display apparatus according to claim 5, wherein said take-up unit comprises:
   at least three rollers with which the thin film flat display is engaged, at least one of the rollers comprising a turning shaft around which said thin film flat display is taken up and accommodated, at least two of the rollers guiding said thin film flat display either toward or away from the turning shaft; and
   a heater that heats the rollers such that the thin film flat display is softened to change shape while being taken up and accommodated by the turning shaft.

7. An information display apparatus according to claim 5, wherein said take-up unit comprises:
   a plurality of fixed and moving rollers with which the thin film flat display is alternately engaged, said fixed and moving rollers being respectively alternately and oppositely disposed in said take-up unit, the thin film flat display being bonded to one of the fixed rollers;
   a plurality of springs that urge the moving rollers in an x-axis direction either toward or away from the one of the fixed rollers; and
   a heater that heats and softens the thin film of the thin film flat display to allow the thin film flat display to fold to a bellows state using the fixed and moving rollers.

* * * * *